United States Patent
Suzuki et al.

[11] Patent Number: 5,578,679
[45] Date of Patent: Nov. 26, 1996

[54] FLAME-RESISTING RESIN COMPOSITION

[75] Inventors: Yasuhiro Suzuki; Masahito Tada, both of Iwaki, Japan

[73] Assignee: Kureha Kagaku Kogyo Kabushiki Kaisha, Tokyo, Japan

[21] Appl. No.: 363,257

[22] Filed: Dec. 22, 1994

[30] Foreign Application Priority Data

Dec. 28, 1993 [JP] Japan ................................ 5-350097

[51] Int. Cl.$^6$ ................................................ C08G 63/48
[52] U.S. Cl. ........................... 525/64; 525/69; 525/70; 525/189; 525/537
[58] Field of Search ................................ 525/64, 69, 537, 525/70, 189

[56] References Cited

U.S. PATENT DOCUMENTS

| | | | |
|---|---|---|---|
| 5,047,465 | 9/1991 | Auerbach | 525/537 |
| 5,164,454 | 11/1992 | Suga et al. | 525/64 |
| 5,244,971 | 9/1993 | Jean-Marc | 525/69 |
| 5,252,656 | 10/1993 | Nonaka et al. | 524/609 |
| 5,290,856 | 3/1994 | Okamoto et al. | 525/69 |

FOREIGN PATENT DOCUMENTS

| | | |
|---|---|---|
| 0327300A1 | 8/1989 | European Pat. Off. . |
| 0338544A3 | 10/1989 | European Pat. Off. . |
| 0368295A3 | 5/1990 | European Pat. Off. . |
| 0488119A3 | 6/1992 | European Pat. Off. . |
| 0506006A3 | 9/1992 | European Pat. Off. . |
| 0557088A3 | 8/1993 | European Pat. Off. . |
| 1-198664 | 10/1989 | Japan . |

*Primary Examiner*—Mark D. Sweet
*Attorney, Agent, or Firm*—David G. Conlin; Peter F. Corless

[57] ABSTRACT

The disclosure describes a flame-resisting resin composition comprising:

(A) 90 to 99.5% by weight of a polyarylene sulfide; and (B) 0.5 to 10% by weight of a graft copolymer composed of an olefinic copolymer (a) having 30 to 59% by weight (based on the weight of said graft copolymer) of an α-olefin repeating unit and a glycidyl ester residue repeating unit of an α,β-unsaturated mono-carboxylic acid, and at least one of polymers (b) having the repeating unit represented by the following formula (I):

said olefinic copolymer (a) being branched or crosslinked with at least one of the polymers (b),

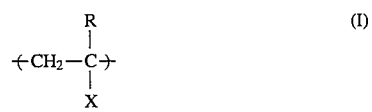

wherein R represents a hydrogen atom or a lower alkyl group having from 1 to about 6 carbon atoms, X represents a benzyl group, —COOCH$_3$, —COOC$_2$H$_5$, —COOC$_4$H$_9$, —COOCH$_2$CH(C$_2$H$_5$)C$_4$H$_9$, —CN, a phenyl group or a maleimide group.

12 Claims, No Drawings

FLAME-RESISTING RESIN COMPOSITION

BACKGROUND OF THE INVENTION

The present invention relates to a flame-resisting resin composition. More specifically, the present invention relates to a flame-resisting resin composition exhibiting a high impact resistance.

Among plastics moldings, most of plastics moldings for electrical and electronic parts, for automobile components as well as for use in factories are particularly required to have an excellent flame-resistance of the V-0 grade of the UL Standard. Moreover, many of these moldings are also required to have a good impact resistance.

A number of resins are known as flame-resisting resins. Polyarylene sulfide, for instance, is well-known to exhibit the V-0 grade of the UL Standard. It is, however, difficult to say that moldings made of polyarylene sulfides satisfy the requirement of the impact resistance. It has been proposed, therefore, to incorporate thereinto an impact modifier such as a copolymer of ethylene and a glycidyl ester of an α,β-unsaturated mono-carboxylic acid. Such resultant resin composition exhibits a flammability of the V-2 grade of the UL Standard or out of the grade of that Standard, and thus fails to satisfy the desired flame-resistance level.

The UL Standard herein used is specified in the "Standard for Tests for Flammability of Plastic Material for Parts in Devices and Appliances", UL 94, Fourth Edition, by Underwriters Laboratories Inc., according to which the "V-0" level is a higher grade in flame-resistance than the "V-2" level, since the V-0 level means a shorter time for which a material continues to flame than that of the V-2 level.

The offer of a rein composition having a flame-resistance of the V-0 grade of the UL Standard and exhibiting a high impact resistance is demanded.

As a result of the present inventors' earnest studies for fulfilling such requirements, it has been found that by adding to a polyarylene sulfide (A) a graft copolymer (B) composed of an olefinic copolymer (a) having 30 to 59% by weight (based on the weight of the graft copolymer) of an α-olefin repeating unit and a glycidyl ester residue repeating unit of an α,β-unsaturated mono-carboxylic acid, and polymers (b) having the repeating unit represented by the following formula (I), the olefinic copolymer (a) being branched or crosslinked with one or more of the polymers (b), the obtained resin composition possesses a flame-resistance of the V-0 grade of the UL Standard and exhibits a high impact resistance:

(I)

(wherein R represents a hydrogen atom or a lower alkyl group having from 1 to about 6 carbon atoms, X represents a benzyl group, —COOCH$_3$, —COO$_2$H$_5$, —COOC$_4$H$_9$, —COOCH$_2$CH(C$_2$H$_5$)C$_4$H$_9$, —CN, a phenyl group or a maleimide group).

On the basis of the finding, the present invention has been attained.

SUMMARY OF THE INVENTION

It is an object of the present invention to provide a resin composition comprising a polyarylene sulfide and an impact modifier, and showing an excellent flame-resistance which is the V-0 grade of the UL Standard and a good impact resistance.

To accomplish the aim, in an aspect of the present invention, there is provided a flame-resisting resin composition comprising: 90 to 99.5% by weight of a polyarylene sulfide (A); and 0.5 to 10% by weight of a graft copolymer (B) composed of an olefinic copolymer (a) having 30 to 59% by weight (based on the weight of the graft copolymer) of an α-olefin repeating unit and a glycidyl ester residue repeating unit of an α,β-unsaturated mono-carboxylic acid, and at least one of polymers (b) having the repeating unit represented by the formula (I), the olefinic copolymer (a) being branched or crosslinked with at least one of the polymers (b).

DETAILED DESCRIPTION OF THE INVENTION

An impact modifier used in the present invention is a graft copolymer (B) composed of an olefinic copolymer (a) having an α-olefin repeating unit and a glycidyl ester residue repeating unit of an α,β-unsaturated mono-carboxylic acid, which olefinic copolymer (a) is branched or chemically crosslinked with one or more of polymers (b) having the repeating unit represented by the following general formula (I):

(I)

(wherein R represents a hydrogen atom or a lower alkyl group having from 1 to about 6 carbon atoms, X represents a benzyl group, —COOCH$_3$, —COOC$_2$H$_5$, —COOC$_4$H$_9$, —COOCH$_2$CH(C$_2$H$_5$)C$_4$H$_9$, —CN, a phenyl group or a maleimide group).

Examples of α-olefins which derive the α-olefin repeating unit of one component of the olefinic copolymer (a) are ethylene, propylene, 1-butene etc., and ethylene is particularly preferred. A glycidyl ester of an α,β-unsaturated mono-carboxylic acid which derives the glycidyl ester residue repeating unit of the α,β-unsaturated mono-carboxylic acid of the other component of the olefinic copolymer (a) is compounds represented by the general formula (II):

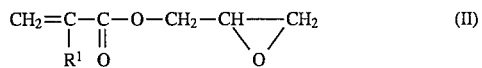
(II)

(wherein R$^1$ represents a hydrogen atom or a lower alkyl group having from 1 to about 4 carbon atoms).

Examples of glycidyl esters of α,β-unsaturated mono-carboxylic acids are glycidyl acrylate, glycidyl methacrylate, glycidyl ethacrylate etc., and glycidyl methacrylate is particularly preferred. These α-olefin and glycidyl ester of the α,β-unsaturaged mono-carboxylic acid may be copolymerized by common radical copolymerization reaction to produce the olefinic copolymer (a).

The olefinic copolymer (a) has 70 to 99% by weight, preferably 75 to 94% by weight, more preferably 80 to 90% by weight of α-olefin repeating unit, and 30 to 1% by weight, preferably 25 to 6% by weight, more preferably 20 to 10% by weight of a glycidyl ester residue repeating unit of an α,β-unsaturated mono-carboxylic acid. One or more of other copolymerizable unsaturated mono-ethylenic monomers such as vinyl ether, vinyl acetate, vinyl propionate, methyl acrylate, methyl methacrylate, acrylonitrile and styrene is used as a comonomer. The content thereof is not more than 40% by weight.

The polymer (b) to be grafted to the olefinic copolymer (a) in the form of branched chain or crosslinked chain is one or more of the polymers having the repeating unit of the above general formula (I). As the polymer (b), homopolymers or copolymers such as polymethyl methacrylate, polyethyl acrylate, polybutyl acrylate, poly-2-ethylhexyl acrylate, polystyrene, polyacrylonitrile, poly(acrylonitrile-styrene) copolymer, copolymer of butyl acrylate and methyl methacrylate, copolymer of butyl acrylate and styrene may be exemplified. Other repeating units than that represented by the above general formula (I) may be contained in a minor proportion (e.g. not more than 30% by weight). These polymers may also be prepared by radical polymerization of corresponding monoethylenic unsaturated monomers.

The graft copolymer composed of the above olefinic copolymer (a) and the polymer (b) has a branched or crosslinked structure, wherein the polymer (b) bond chemically to the olefinic copolymer (a) at least at one point.

The process for producing such graft copolymers is not particularly limited, and any one of generally known grafting processes such as a chain-transfer process, an ionizing-irradiation process and the like may be applied. An example of a suitable process is set forth below (Japanese Patent Application Laid Open (KOKAI) Nos. 1-131220, 1-138214 and 1-198664).

Precisely, to an aqueous suspension of 100 parts by weight of the above olefinic copolymer (a), are added 5 to 400 parts by weight of monoethylenic unsaturated monomers as the starting materials of a graft copolymer. Then, at least one of the radical (co)polymeric organic peroxides represented by the following general formula (III) or (IV), is added to the resultant suspension at 0.1 to 10 parts by weight based on 100 parts by weight of monoethylenic unsaturated monomer.

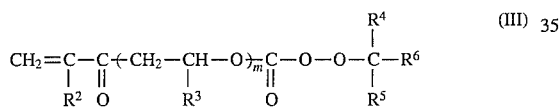

(wherein $R^2$ represents a hydrogen atom or a lower alkyl group having 1 to about 2 carbon atoms, $R^3$ represents a hydrogen atom or a methyl group, $R^4$ and $R^5$ each represents a lower alkyl group having from 1 to about 4 carbon atoms, $R^6$ represents an alkyl group having from 1 to about 12 carbon atoms, a phenyl group, an alkyl-substituted phenyl group or a cycloalkyl group having from 3 to about 12 carbon atoms, m is 1 or 2)

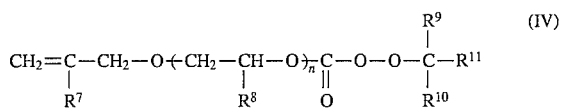

(wherein $R^7$ represents a hydrogen atom or a lower alkyl group having from 1 to about 4 carbon atoms, $R^8$ represents a hydrogen atom or a methyl group, $R^9$ and $R^{10}$ each represents a lower alkyl group having 1 to about 4 carbon atoms, $R^{11}$ represents an alkyl group having from 1 to about 12 carbon atoms, a phenyl group, a lower alkyl-substituted phenyl group or a cycloalkyl group having from 3 to about 12 carbon atoms, n is 1 or 2).

Further, a radical polymerization initiator having a decomposition point of 40° to 90° C. to give a 10 hour half life is added in an amount of 0.01 to 5 parts by weight based on 100 parts by weight of the total of the monoethylenic unsaturated monomers and the radical (co)polymeric organic peroxide. The obtained mixture is heated under the conditions substantially unable to take place the decomposition of radical polymerization initiator, so that the olefinic copolymer (a) may be impregnated with the monoethylenic unsaturated monomers, the radical (co)polymeric organic peroxide and the radical polymerization initiator. When an impregnation ratio thereof is reached not less than about 50% the temperature of this aqueous suspension is elevated to take place the copolymerization of the monoethylenic unsaturated monomers and the radical (co)polymeric organic peroxide within the olefinic copolymer (a). Thus obtained grafted precursor is melt-blended at a temperature of 100° to 300° C. to obtain a graft copolymer.

The olefinic copolymer (a) and the polymer (b) as components of the graft copolymer may suitably be used in a weight ratio of 95:5 to 40:60, preferably 80:20 to 50:50, provided that the graft copolymer has an α-olefin repeating unit content of 30 to 59% by weight. If the content of the α-olefin repeating unit exceeds 59% by weight, flame-resistance of the V-0 grade could not be fulfilled. If the content of the α-olefin repeating unit is less than 30% by weight, moldability may be deteriorated. The content of the α-olefin repeating unit is preferably 35 to 58% by weight, more preferably 40 to 57% by weight.

If the amount of graft copolymer is too small, an desired impact resistance imparting effect can not obtained. If the amount of graft copolymer is too large, the heat deformation temperature may lower and the mechanical properties such as rigidity deteriorate. A resin composition is suitably composed of 90 to 99.5% by weight, preferably 92 to 98% by weight, more preferably 95 to 97% by weight of the polyarylene sulfide and 0.5 to 10% by weight, preferably 2 to 8% by weight, more preferably 3 to 5% by weight of the graft copolymer.

A polyarylene sulfide to be used in the present invention is a polymer containing at least 70 mol % of repeating unit represented by the following structural formula:

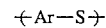

(wherein Ar represents an arylene group).

A typical example thereof is a polyphenylene sulfide containing at least 70 mol % of repeating unit represented by the following structural formula:

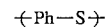

(wherein Ph represents a phenylene group).

Suitable polyphenylene sulfides are those having a melt viscosity of 1 to 2000 Pa·s, particularly of 10 to 500 Pa·s when measured at a temperature of 310° C. and a shear rate of 1200/second.

Several types of polyarylene sulfides are known depending on their production processes. A resin having a substantially linear molecular structure with neither branched nor crosslinked structure, a resin having a partially crosslinked structure as well as a resin having both branched structure and crosslinked structure and obtained by subjecting to so-called "cure" treatment for increasing the melt viscosity by oxidation crosslinking may be exemplified. Any one of these resins may be used in the present invention. A resin having a substantially linear structure, particularly, with no or a little branched structure is more preferable, and a resin having a partially crosslinked structure may also be preferable. The expression "resin having a substantially linear structure" herein means a resin having a solubility of 0.7 to 1 time based on the solubility of the solvent having the highest solubility for linear polyarylene sulfide. For example, the relevant solvent for PPS (polyphenylene sulfide) is α-chloronaphthalene, and the solvent for PKS(polyphenylene sulfide ketone) is concentrated sulfuric acid.

The resin composition of the present invention may contains other resins than polyarylene sulfide and the copolymer mentioned above, but use of polyarylene sulfide and the above copolymer only is preferred.

In use, the resin composition of the present invention may be mixed with inorganic materials. To 100 parts by weight of the resin composition of the present invention may be mixed not more than 200 parts by weight, preferably not more than 100 parts by weight of inorganic materials. Inorganic materials which may be used are not particularly limited. As the inorganic material, fibrous reinforcing materials such as glass fiber, metallic fiber and ceramic fiber; mica; calcium hydroxide; talc; fused silica; crystalline silica; ferrite magnetic powder; glass beads; powder quartz; and antimony oxide may be exemplified. Any of known processes such as melt-blending process may be used for preparing such composition.

Fibrous materials having a fiber length of 0.5 μm to 20 mm and a fiber diameter of 0.1 to 30 μm, particulate materials having a particle size of 0.01 to 100 μm, and plate-like materials having a lamella diameter of 0.1 to 100 μm and a thickness of 0.1 to 50 μm may be preferably used.

Moldings made from the resin composition of the present invention exhibit a good flame-resistance of the V-0 level or less of UL-94 Standard and a high impact resistance corresponding to an Izod impact strength not less than 35 J/m, preferably not less than 40 J/m according to ASTM D-256.

The resin composition showing an excellent flame-resistance and impact strength according to the present invention has also properties such as excellent heat-resisting property, dimensional stability, chemical resistance and non-contaminativity to a contacting member.

Also, the resin composition according to the present invention is used as a raw material of insulating materials for electric or electronic machinery and apparatus, and for transports such as automobiles electric cars and airplanes; plastic articles such as pipes, tanks, etc. in the house hold or factory; and construction materials.

EXAMPLES

Descriptions will be made more specifically to the present invention by way of examples but the invention is not restricted only to the following examples unless it does not go beyond the scope thereof.

Test methods employed in Examples for evaluation of physical properties:

Flammability test: according to UL-94 Standard

Izod impact strength: according to ASTM D-256

Example 1

In a stainless steel autoclave, 0.25 parts by weight of polyvinyl alcohol as a suspending agent were dissolved in 250 parts by weight of demineralized water. 60 parts by weight of copolymer consisting of 85% by weight of ethylene repeating unit and 15% by weight of glycidyl methacrylate repeating unit were introduced thereinto, then stirred to be dispersed. 0.2 parts by weight of benzoyl peroxide as a radical polymerization initiator and 0.8 parts by weight of t-butylperoxymethacryloyloxyethyl carbonate as a radical (co)polymeric organic peroxide were dissolved in a mixture of 12 parts by weight of acrylonitrile and 28 parts by weight of styrene. The obtained solution was introduced into the previously prepared suspension and then stirred.

Then, the resultant suspension was heated to a temperature of 60° to 65° C. and vinyl monomer containing benzylperoxide and t-butylperoxymethacryloyloxyethyl carbonate was impregnated into the copolymer for 2 hours with stirring. Thereafter, acrylonitrile and styrene were subjected to copolymerization reaction at 80° C. Then, graft copolymerization was carried out in an extruder having a cylinder temperature of 200° C. The obtained graft copolymer had 51% by weight of ethylene repeating unit.

To prepare a resin composition, 4 parts by weight of the above obtained graft copolymer (the content of the graft copolymer in the resin composition is 3.8% by weight) and 100 parts by weight of polyphenylene sulfide (the content of the polyphenylene sulfide in the resin composition is 96.2% by weight) were mixed in a Henschel mixer, then the obtained polyphenylene sulfide resin composition was pelletized through an extruder having a cylinder temperature of 310° C. Thereafter, by means of an injection molding machine having a cylinder temperature of 310° C. and a mold temperature of 120° C., test pieces were prepared and the physical properties were measured. The test results showed the V-0 grade of UL 94 Standard in the flammability test and an Izod impact strength of 44 J/m. Main composition elements and physical properties are shown in Table 1 together with those of other examples and comparative examples.

In the Table 1, PPS represents polyphenylene sulfide, GMA represents glycidyl methacrylate, AN represents acrylonitrile and ST represents styrene.

TABLE 1

|  | Ratio of components (wt %) | | Resin composition graft copolymer (wt %) | | | |
| --- | --- | --- | --- | --- | --- | --- |
|  | PPS | graft copolymer | ethylene | GMA | AN | ST |
| Examples | | | | | | |
| 1 | 96.2 | 3.8 | 51 | 9 | 12 | 28 |
| 2 | 90.9 | 9.1 | 51 | 9 | 12 | 28 |
| 3 | 96.2 | 3.8 | 48 | 12 | 12 | 28 |
| 4 | 96.2 | 3.8 | 51 | 9 | 12 | 28 |
| 5 | 96.2 | 3.8 | 58.5 | 10.3 | 9.4 | 21.8 |
| Comp. Examples | | | | | | |
| 1 | 96.2 | 3.8 | 59.5 | 10.5 | 9 | 21 |
| 2 | 96.2 | 3.8 | 63 | 7 | 9 | 21 |
| 3 | 100.0 | 0 | — | — | — | — |

|  | Glass fiber based on 100 parts of resin composition (parts) | UL94 | Izod impact strength (J/m) |
| --- | --- | --- | --- |
| Examples | | | |
| 1 | 0 | V-0 | 44 |
| 2 | 0 | V-0 | 120 |
| 3 | 0 | V-0 | 64 |
| 4 | 9.6 | V-0 | 74 |
| 5 | 0 | V-0 | 39 |
| Comp. Examples | | | |
| 1 | 0 | V-2 | 40 |
| 2 | 0 | V-2 | 20 |
| 3 | 0 | V-0 | 19 |

Example 2

The same procedure as Example 1 was carried out, except that the same graft copolymer as Example 1 was used in an amount of 10 parts by weight (the content of the graft copolymer in the resin composition is 9.1% by weight) in place of 4 parts by weight in Example 1. The test results showed the V-0 grade of the UL 94 Standard in the flammability test and an Izod impact strength of 120 J/m.

Example 3

The same procedure as Example 1 was carried out, except that a copolymer having of 80% by weight of ethylene repeating unit and 20% by weight of glycidyl methacrylate repeating unit was used instead of the copolymer having 85% by weight of ethylene repeating unit and 15% by weight of glycidyl methacrylate repeating unit. The graft copolymer had 48% by weight of ethylene repeating unit. The test results showed the V-0 grade of the UL 94 Standard in the flammability test and an Izod impact strength of 64 J/m.

Example 4

To prepare a resin composition, 4 parts by weight of the same graft copolymer as Example 1 and 100 parts by weight of polyphenylene sulfide were mixed in a Henschel mixer, then 10 parts by weight of glass fiber (diameter: 13 µm, average length: 3 mm) was added thereto and mixed. Thereafter, with a cylinder temperature of 310° C. and a mold temperature of 140° C., test pieces were prepared and the physical properties were measured. The test results showed the V-0 grade of UL 94 Standard in the flammability test and an Izod impact strength of 74 J/m.

Comparative Example 1

The same procedure as Example 1 was carried out, except that benzylperoxide and others were impregnated into a mixture of 70 parts by weight of copolymer having 85% by weight of ethylene repeating unit and 15% by weight of glycidyl methacrylate repeating unit, 9 parts by weight of acrylonitrile and 21 parts by weight of styrene. The graft copolymer had 59.5% by weight of ethylene repeating unit. The test results showed the V-2 grade of the UL 94 Standard in the flammability test and an Izod impact strength of 40 J/m.

Comparative Example 2

The same procedure as Example 1 was carried out, except that benzylperoxide and others were impregnated into a mixture of 70 parts by weight of copolymer having 90% by weight of ethylene and 10% by weight of glycidyl methacrylate, 9 parts by weight of acrylonitrile and 21 parts by weight of styrene. The graft copolymer had 63% by weight of ethylene repeating unit. The test results showed the V-2 grade of the UL 94 Standard in the flammability test and an Izod impact strength of 20 J/m. The obtained composition had an acrylonitrile repeating unit content of 0.34% by weight.

Comparative Example 3

The same polyphenylene sulfide as Example 1 was used alone, test pieces were prepared in the same way as Example 1 and the physical properties were measured. The test results showed the V-0 grade of UL94 Standard in the flammability test and an Izod impact strength of 19 J/m.

What is claimed is:

1. A flame-resisting resin composition comprising:
   (A) 90 to 99.5% by weight of a polyarylene sulfide; and
   (B) 0.5 to 10% by weight of a graft copolymer composed of an olefinic copolymer (a) having 30 to 59% by weight, based on the weight of said graft copolymer, of an α-olefin repeating unit and a glycidyl ester residue repeating unit of an α,β-unsaturated mono-carboxylic acid, and at least one of polymers (b) having the repeating unit represented by the following formula (I):
   said olefinic copolymer (a) being branched or crosslinked with at least one of the polymers (b),

wherein R represents a hydrogen atom or a lower alkyl group having from 1 to about 6 carbon atoms, X represents a benzyl group, $-COOCH_3$, $-COOC_2H_5$, $-COOC_4H_9$, $-COOCH_2CH(C_2H_5)C_4H_9$, $-CN$, a phenyl group or a maleimide group.

2. A flame-resisting resin composition according to claim 1, wherein X in the formula (I) represents a phenyl group, $-CN$ group or a maleimide group.

3. A flame-resisting resin composition according to claim 1, wherein said graft copolymer has 35 to 58% by weight of said α-olefin repeating unit.

4. A flame-resisting resin composition according to claim 1, wherein said olefinic polymer (a) has 70 to 99% by weight of said α-olefin repeating unit and 1 to 30% by weight of said glycidyl ester residue repeating unit of α,β-unsaturated mono-carboxylic acid.

5. A flame-resisting resin composition according to claim 1, wherein said resin composition is composed of 2 to 8% by weight of said graft copolymer and 92 to 98% by weight of said polyarylene sulfide.

6. A flame-resisting resin composition according to claim 1, wherein said graft copolymer contains said olefinic copolymer (a) and said polymers (b) in a weight ratio of 95:5 to 40:60.

7. A flame-resisting composition of claim 1, wherein the graft copolymer has 40 to 57% by weight of the α-olefin repeating unit.

8. A flame-resisting composition of claim 1, wherein the resin composition is comprised of 3 to 5% by weight of the graft copolymer and 95 to 97% by weight of the polyarylene sulfide.

9. A flame-resisting composition of claim 1, wherein the olefinic polymer (a) has 75 to 94% by weight of the α-olefin repeating unit and 6 to 25% by weight of the glycidyl ester residue repeating unit of α,β-unsaturated mono-carboxylic acid.

10. A flame-resisting composition of claim 1, wherein the olefinic polymer (a) has 80 to 90% by weight of the α-olefin repeating unit and 10 to 20% by weight of the glycidyl ester residue repeating unit of α,β-unsaturated mono-carboxylic acid.

11. A flame-resisting composition of claim 1, wherein the composition consists essentially of the polyarylene sulfide and the graft copolymer.

12. A flame-resisting composition of claim 1, wherein the composition consists of the polyarylene sulfide and the graft copolymer.

* * * * *